(12) United States Patent
Maekawa et al.

(10) Patent No.: US 10,088,253 B2
(45) Date of Patent: Oct. 2, 2018

(54) THERMOSTAT, WATER COOLING DEVICE, WATER-COOLED ENGINE, AND VESSEL PROPULSION APPARATUS

(71) Applicant: YAMAHA HATSUDOKI KABUSHIKI KAISHA, Iwata-shi, Shizuoka (JP)

(72) Inventors: Shinya Maekawa, Shizuoka (JP); Kouichi Isozaki, Shizuoka (JP); Kimitaka Saruwatari, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 788 days.

(21) Appl. No.: 14/488,326

(22) Filed: Sep. 17, 2014

(65) Prior Publication Data

US 2015/0114324 A1    Apr. 30, 2015

(30) Foreign Application Priority Data

Oct. 31, 2013    (JP) .................................. 2013-227330

(51) Int. Cl.

| | |
|---|---|
| *F01P 7/14* | (2006.01) |
| *F28F 27/00* | (2006.01) |
| *F01P 7/16* | (2006.01) |
| *F01P 3/02* | (2006.01) |
| *F16K 31/00* | (2006.01) |

(Continued)

(52) U.S. Cl.
CPC ............ *F28F 27/00* (2013.01); *B63H 20/28* (2013.01); *F01P 3/02* (2013.01); *F01P 7/16* (2013.01); *F16K 31/002* (2013.01); *G05D 23/022* (2013.01); *F01P 2003/021* (2013.01); *F01P 2050/12* (2013.01)

(58) Field of Classification Search
CPC .. F16J 15/164; F01P 3/202; F01P 7/16; F16K 1/2261
USPC ............................................... 123/41.1, 41.08
See application file for complete search history.

(56) References Cited

U.S. PATENT DOCUMENTS

| | | | |
|---|---|---|---|
| 9,217,358 B2 * | 12/2015 | Park .......................... | F16K 1/36 |
| 2005/0150476 A1 * | 7/2005 | Gohrbandt ................ | F02F 1/16 |
| | | | 123/193.2 |

(Continued)

FOREIGN PATENT DOCUMENTS

| | | |
|---|---|---|
| JP | 11-11390 A | 1/1999 |
| JP | 2008-95918 A | 4/2008 |

*Primary Examiner* — Marguerite McMahon
*Assistant Examiner* — James Kim
(74) *Attorney, Agent, or Firm* — Keating and Bennett, LLP

(57) ABSTRACT

A thermostat includes an annular flange extending in radial directions and surrounded by a cylindrical large-diameter portion of a housing inner surface, and a frame extending in axial directions from the flange. The thermostat further includes a sealing member that hermetically seals the gap between the flange and the inner surface. The sealing member includes an annular outer peripheral portion sandwiched in the axial directions by the inner surface and a thermostat cover inside the large-diameter portion, and a plurality of protruding portions extending outward in the radial directions from the outer peripheral portion toward the large-diameter portion. The thermostat is disposed inside a housing that defines a portion of a cooling water passage, and opens and closes the cooling water passage according to the temperature of cooling water inside the cooling water passage.

19 Claims, 5 Drawing Sheets

(51) Int. Cl.
  *G05D 23/02* (2006.01)
  *B63H 20/28* (2006.01)

(56) References Cited

U.S. PATENT DOCUMENTS

| | | | | |
|---|---|---|---|---|
| 2008/0185247 | A1* | 8/2008 | Kim | F16F 9/369 188/322.16 |
| 2008/0251591 | A1* | 10/2008 | Miyamoto | F16K 31/002 236/99 K |
| 2010/0133757 | A1* | 6/2010 | Maeda | F16J 15/3208 277/436 |
| 2011/0297365 | A1* | 12/2011 | Hamaguchi | F01P 3/20 165/300 |
| 2012/0097750 | A1* | 4/2012 | Kusakabe | G05D 23/022 236/93 R |
| 2013/0178121 | A1* | 7/2013 | Sakamoto | B63H 20/26 440/89 A |
| 2013/0207386 | A1* | 8/2013 | Jamison | F16L 13/148 285/335 |

* cited by examiner

THERMOSTAT, WATER COOLING DEVICE, WATER-COOLED ENGINE, AND VESSEL PROPULSION APPARATUS

BACKGROUND OF THE INVENTION

1. Field of the Invention

The present invention relates to a thermostat that opens and closes a cooling water passage, a water cooling device including the thermostat, a water-cooled engine including the water cooling device, and a vessel propulsion apparatus powered by the engine.

2. Description of the Related Art

Japanese Patent Application Publication No. 2008-95918 discloses a thermostat disposed inside a cooling water passage defined by two side walls. The thermostat includes a thermo element that moves a valve, a frame that supports the thermo element, and a rubber body sandwiched in the axial directions by the two side walls.

As shown in FIG. 5 of this publication, the set value of the gap in the radial directions between the frame of the thermostat and the inner wall surface of the cooling water passage is small. In this case, with a variation of the fitting position of the thermostat, or a positional change of the thermostat caused by aging or deterioration, the frame of the thermostat may come into contact with the inner wall surface of the cooling water passage due to factors such as variations in the dimensions of the thermostat.

A conventional frame is made of copper or stainless steel, and a conventional cooling water passage is made of aluminum. Specifically, the cooling water passage is made of a metal material having an ionization tendency higher than that of the frame. Therefore, if the frame is in continuous contact with the inner wall surface of the cooling water passage and cooling water remains between the frame and the cooling water passage, corrosion of the cooling water passage progresses, and a hole that causes water leakage may be formed. In particular, when the cooling water is seawater, the cooling water passage corrodes more quickly.

To prevent the frame of the thermostat and the inner wall surface of the cooling water passage from coming into contact with each other, the gap in the radial directions between the frame and the cooling water passage may be increased. However, if the gap between the frame and the cooling water passage is large, an allowable movement amount of the frame with respect to the inner wall surface of the cooling water passage is decreased, so that when the thermostat is fitted to the cooling water passage, the stability of the position of the thermostat (before the sealing member of the thermostat is inserted) is deteriorated. Therefore, the fixing position (position after the sealing member is inserted) of the thermostat may deviate from an intended position. Therefore, even if the gap between the frame and the cooling water passage is increased, a gap having an intended size may not be achieved between the frame and the cooling water passage.

SUMMARY OF THE INVENTION

In order to overcome the previously unrecognized and unsolved challenges described above, a preferred embodiment of the present invention provides a thermostat that is disposed in a housing defining a portion of a cooling water passage, and opens and closes the cooling water passage according to the temperature of cooling water inside the cooling water passage. The thermostat includes an annular flange extending in radial directions (radial directions of a housing inner surface) surrounded by a cylindrical large-diameter portion of the housing inner surface, a frame extending in axial directions (axial directions of the housing inner surface) from the flange, and a sealing member made of an elastic material and arranged to seal the gap between the flange and the housing inner surface. The sealing member includes an annular outer peripheral portion sandwiched in the axial directions by the housing inner surface and the thermostat cover inside the large-diameter portion of the housing inner surface, and a plurality of protruding portions extending outward in radial directions from the outer peripheral portion toward the large-diameter portion of the housing inner surface.

According to this arrangement of a preferred embodiment of the present invention, the annular outer peripheral portion and the plurality of protruding portions are provided on the sealing member of the thermostat. The plurality of protruding portions extend outward in radial directions from the outer peripheral portion toward the large-diameter portion of the housing inner surface. Thus, the gap in the radial directions between the sealing member and the large-diameter portion of the housing inner surface decreases, as compared to the case in which the protruding portions are not provided. Therefore, the size of the gap between the frame and the housing inner surface is stabilized and the stability of the position of the thermostat when the thermostat is fitted to the housing is improved. Accordingly, a large gap is provided between the frame and the housing inner surface so that it is maintained that the frame and the housing inner surface are spaced apart from each other.

The sealing member is preferably made of an elastic material. The outer peripheral portion of the sealing member is elastically deformed by being sandwiched in the axial directions by the housing inner surface and the thermostat cover inside the large-diameter portion of the housing inner surface. Accordingly, the gap between the flange and the housing inner surface is hermetically sealed by the sealing member. The entire outer peripheral portion of the sealing member is not enlarged outward in radial directions, but the plurality of protruding portions extend outward in radial directions from the outer peripheral portion and are aligned at intervals in the circumferential direction, so that the volume of the portion (a portion of the sealing member) sandwiched by the housing inner surface and the thermostat cover is reduced. Accordingly, the amount of elastic deformation of the sealing member is reduced to be within a proper range. Therefore, excellent sealing performance is maintained for a long period of time.

In a preferred embodiment of the present invention, it is preferable that the outer ends of the protruding portions are disposed on a circumference coaxial with the outer peripheral portion and having a diameter larger than an inner diameter of the large-diameter portion in a free state, and the outer diameter of the outer peripheral portion is smaller than the inner diameter of the large-diameter portion.

According to this arrangement of a preferred embodiment of the present invention, the outer ends of the protruding portions are disposed on a circumference having a diameter larger than an inner diameter of the large-diameter portion of the housing inner surface. The outer diameter of the outer peripheral portion is smaller than the inner diameter of the large-diameter portion. Therefore, when the thermostat is fitted to the housing, the protruding portions are compressed in radial directions between the large-diameter portion and the outer peripheral portion. Specifically, the sealing member is fitted to the housing while being press-fitted into the large-diameter portion of the housing. By this press fitting, the stability of the position of the thermostat when the thermostat is fitted to the housing is further improved. Therefore, when the thermostat is fitted, the thermostat is prevented from detaching from the housing.

In a preferred embodiment of the present invention, the plurality of protruding portions are preferably disposed at equal or substantially equal intervals in the circumferential direction (circumferential direction of the housing inner surface).

According to this arrangement of a preferred embodiment of the present invention, the protruding portions are disposed on the outer peripheral portion at equal or substantially equal intervals in the circumferential direction, so that the gaps in the radial directions between the protruding portions and the large-diameter portion of the housing inner surface decrease at the plurality of positions at equal or substantially equal intervals in the circumferential direction. Therefore, when the thermostat is fitted to the housing, the sealing member is easily and uniformly elastically deformed. Therefore, tilting of the thermostat in the radial directions when the thermostat is fitted to the housing is reduced or prevented. Accordingly, the gap between the frame and the housing inner surface is further stabilized.

In a preferred embodiment of the present invention, the outer surfaces of the protruding portions preferably include inclined portions extending obliquely inward in radial directions toward the frame.

According to this arrangement of a preferred embodiment of the present invention, the outer surfaces of the protruding portions include inclined portions extending obliquely inward in radial directions toward the frame. Therefore, the thermostat is fitted to the housing while being guided by the inclined portions. Accordingly, the thermostat is easily fitted to the housing.

In a preferred embodiment of the present invention, the plurality of protruding portions preferably include at least three protruding portions.

According to this arrangement of a preferred embodiment of the present invention, at least three or more protruding portions are preferably provided. Therefore, the sealing member includes three or more portions at which the gap in the radial directions between the sealing member and the large-diameter portion of the housing inner surface is small. Therefore, when the thermostat is fitted to the housing, the position of the thermostat with respect to the housing hardly deviates. Accordingly, the stability of the position of the thermostat when the thermostat is fitted to the housing is further improved.

Another preferred embodiment of the present invention provides a water cooling device including a metal housing that includes a cylindrical housing inner surface defining a portion of a cooling water passage, the thermostat including a frame made of a metal material having an ionization tendency lower than that of the housing, and a thermostat cover sandwiching the outer peripheral portion of the sealing member of the thermostat in the axial directions in conjunction with the housing inner surface inside the large-diameter portion of the housing inner surface.

In another preferred embodiment of the present invention, the housing is preferably made of aluminum, and the frame is preferably made of copper or stainless steel.

According to this arrangement of a preferred embodiment of the present invention, the housing is made of aluminum, and the frame is made of copper or stainless steel. The housing is made of a metal material having an ionization tendency higher than that of the frame, so that the housing corrodes more easily than the frame. As described above, the plurality of protruding portions are provided on the sealing member, so that the stability of the position of the thermostat when the thermostat is fitted to the housing is improved. Therefore, even if the gap in the radial directions between the frame and the housing inner surface is increased, it is maintained that the frame and the housing inner surface are spaced apart from each other. Accordingly, water leakage is prevented from occurring due to the contact between the frame and the housing.

Still another preferred embodiment of the present invention provides a water-cooled engine including the water cooling device and a cylinder body integral and unitary with the housing of the water cooling device.

According to this arrangement of a preferred embodiment of the present invention, the water-cooled engine includes a cylinder body integral and unitary with the housing of the water cooling device. Accordingly, the number of components of the engine is reduced as compared to the case in which the housing and the cylinder body are separate members.

Still another preferred embodiment of the present invention provides a vessel propulsion apparatus including the water-cooled engine and a water pump that supplies water outside the vessel propulsion apparatus into a cooling water passage of the water-cooled engine.

According to this arrangement of a preferred embodiment of the present invention, the water pump supplies water outside the vessel propulsion apparatus into the cooling water passage. When the vessel propulsion apparatus is used at sea, seawater flows in the cooling water passage, so that corrosion of the housing easily progresses. Even in this case, the thermostat is maintained in the state in which the frame and the housing inner surface are spaced apart from each other so that the cooling water passage is prevented from corroding.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
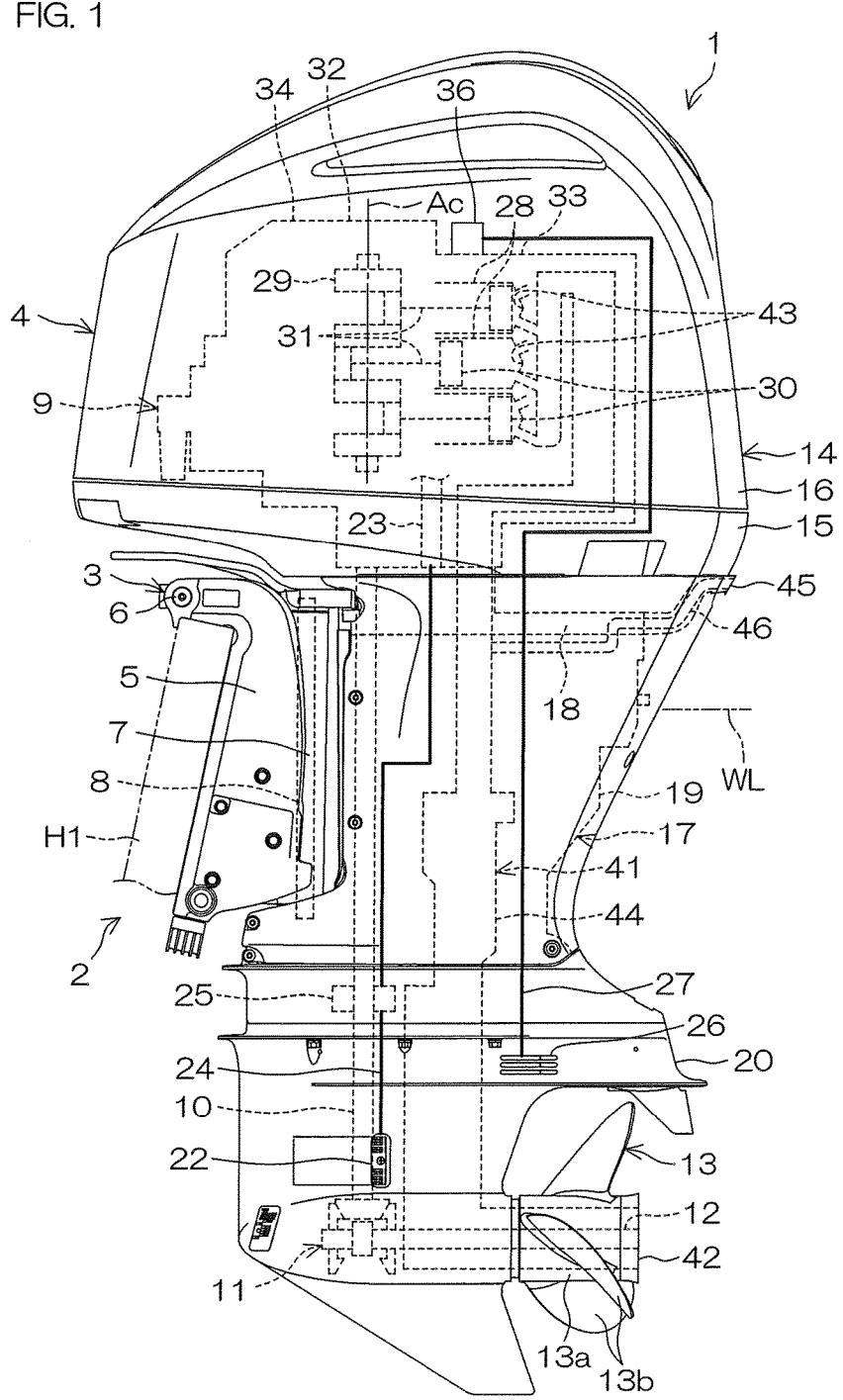
FIG. 1 is a schematic side view showing a vessel according to a preferred embodiment of the present invention.

FIG. 1 is a schematic side view showing a vessel 1 according to a preferred embodiment of the present invention.

As shown in FIG. 1, the vessel 1 includes a hull H1 that floats on a water surface, and a vessel propulsion apparatus 2 that propels the hull H1. The vessel propulsion apparatus 2 includes a suspension device 3 attachable to the rear portion (stern) of the hull H1, and an outboard motor 4 joined to the suspension device 3.

As shown in FIG. 1, the suspension device 3 includes a pair of left and right clamp brackets 5 to be attached to the hull H1, and a swivel bracket 7 attached to a tilting shaft 6 supported in an orientation extending in the left-right direction by the pair of clamp brackets 5. The suspension device 3 further includes a steering shaft 8 supported in an orientation extending in the up-down direction by the swivel bracket 7.

As shown in FIG. 1, the outboard motor 4 is attached to the steering shaft 8. The steering shaft 8 is supported by the swivel bracket 7 rotatably around a steering shaft axis (center line of the steering shaft 8) extending in the up-down direction.

As shown in FIG. 1, the swivel bracket 7 is supported by the clamp brackets 5 via the tilting shaft 6. The swivel bracket 7 is turnable around the tilt axis (center line of the tilting shaft 6) extending in the left-right direction with respect to the clamp brackets 5. The outboard motor 4 is turnable to the left and right with respect to the suspension device 3, and turnable up and down with respect to the suspension device 3. Therefore, the outboard motor 4 is turnable to the left and right with respect to the hull H1, and turnable up and down with respect to the hull H1.

As shown in FIG. 1, the outboard motor 4 includes an engine 9 that generates power to rotate a propeller 13, and a power transmitting device that transmits the power of the engine 9 to the propeller 13. The power transmitting device includes a drive shaft 10 joined to the engine 9, a forward/reverse switching mechanism 11 joined to the drive shaft 10, and a propeller shaft 12 joined to the forward/reverse switching mechanism 11. The outboard motor 4 further includes a cowling (engine cover) 14 that covers the engine 9 and a casing 17 that houses the power transmitting device.

As shown in FIG. 1, the cowling 14 accommodates the engine 9. The cowling 14 includes a bottom cover 15 that accommodates the engine 9, and a cup-shaped top cover 16 opening downward. The top cover 16 is attached to the bottom cover 15 in a removable manner. The opening portion of the top cover 16 overlaps the opening portion of the bottom cover 15 in the up-down direction via an unillustrated seal. The bottom cover 15 is attached to a casing 17 (specifically, an exhaust guide 18 described below).

Figure 2:
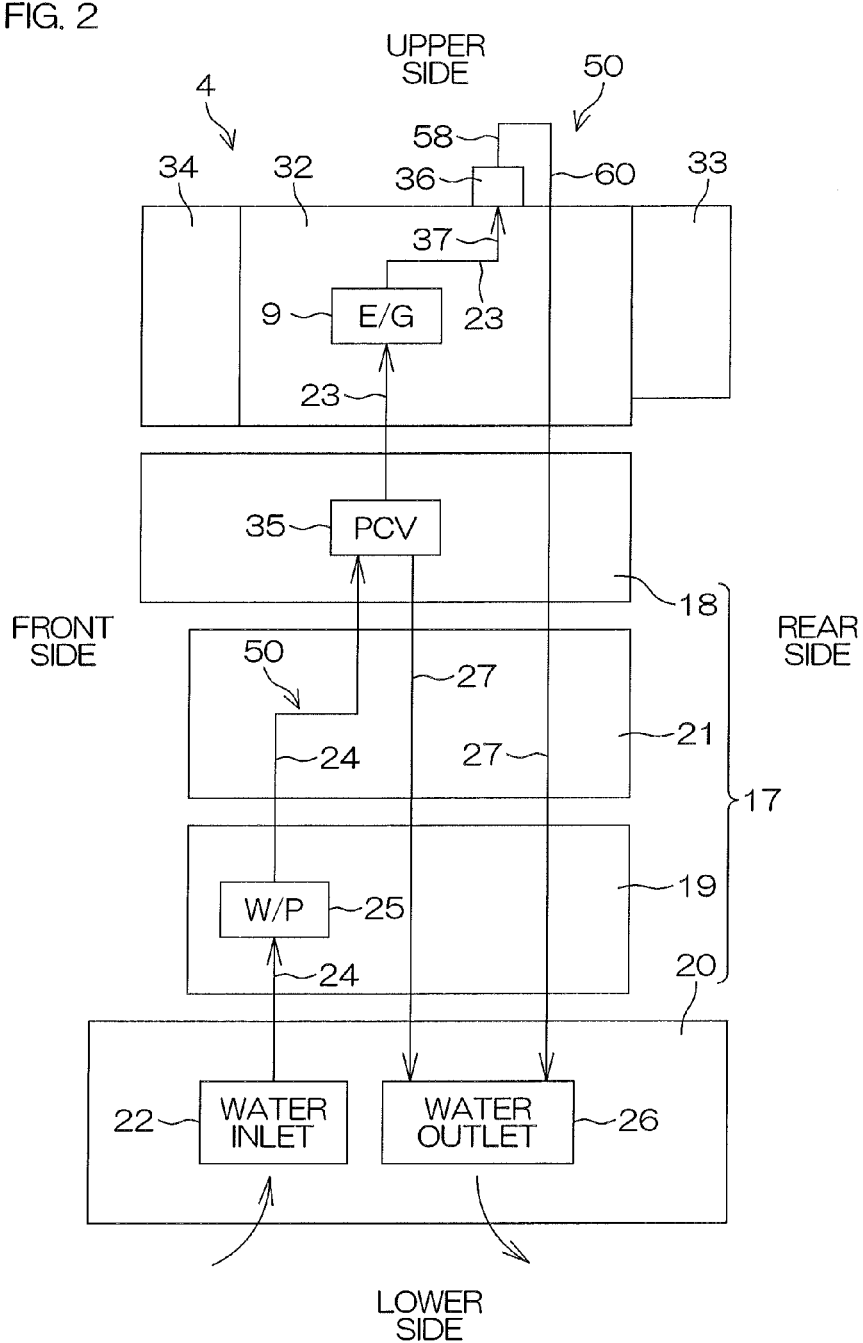
FIG. 2 is an outline drawing of the inside of an outboard motor showing a flow of cooling water in a water cooling device.

FIG. 2 is an outline drawing of the inside of the outboard motor 4, showing a flow of cooling water in the water cooling device 50. The orientations of the members shown in FIG. 2 are the same as in FIG. 1.

As shown in FIG. 2, the casing 17 includes an exhaust guide 18 disposed below the engine 9 and an oil pan 21 disposed below the exhaust guide 18. The casing 17 further includes an upper case 19 disposed below the oil pan 21 and a lower case 20 disposed below the upper case 19.

As shown in FIG. 1, the engine 9 is mounted on the exhaust guide 18. The engine 9 is disposed at a higher position than the steering shaft 8. The exhaust guide 18 is an engine support member that supports the engine 9 in an orientation in which the rotation axis (crankshaft axis Ac) of the engine 9 is vertical or substantially vertical.

As shown in FIG. 1, the engine 9 is an internal combustion engine. The engine 9 includes a cylinder body 32 that houses a plurality of pistons 30, a cylinder head 33 defining a plurality of cylinders 28 in conjunction with the cylinder body 32, and a crankcase 34 that houses a crankshaft 29. Additionally referring to FIG. 2, the cylinder head 33 is attached to the cylinder body 32 from the rear side. The crankcase 34 is attached to the cylinder body 32 from the front side.

As shown in FIG. 1, the engine 9 includes the crankshaft 29 rotatable around the crankshaft axis Ac, a plurality of pistons 30, and connecting rods 31. The crankshaft 29 is joined to the plurality of pistons 30 by the connecting rods 31. The engine 9 further includes a plurality of combustion chambers 43 defined by the cylinder head 33.

As shown in FIG. 1, the engine 9 is disposed over the drive shaft 10. The drive shaft 10 extends in the up-down direction inside the casing 17. The center line of the drive shaft 10 may be disposed on the rotation axis of the engine 9, or may deviate from the rotation axis of the engine 9. The upper end portion of the drive shaft 10 is joined to the lower end portion of the crankshaft 29, and the lower end portion of the drive shaft 10 is joined to the front end portion of the propeller shaft 12 via the forward/reverse switching mechanism 11. The propeller shaft 12 extends in the front-rear direction inside the casing 17. The rear end portion of the propeller shaft 12 projects rearward from the casing 17. The propeller 13 is attached to the rear end portion of the propeller shaft 12 in a removable manner. The propeller 13 includes an outer cylinder 13a surrounding the propeller shaft 12 around the propeller shaft axis (center line of the propeller shaft 12), and a plurality of blades 13b extending outward from the outer cylinder 13a. The outer cylinder 13a and the blades 13b rotate around the propeller shaft axis together with the propeller shaft 12.

As shown in FIG. 1, the engine 9 rotates in a fixed rotating direction. The rotation of the engine 9 is transmitted to the propeller 13 by the power transmitting mechanism (the drive shaft 10, the forward/reverse switching mechanism 11, and the propeller shaft 12). Accordingly, the propeller 13 rotates together with the propeller shaft 12, and thrust to cause the vessel 1 to travel forward or backward is generated. The direction of the rotation to be transmitted from the drive shaft 10 to the propeller shaft 12 is switched by the forward/reverse switching mechanism 11. Therefore, the rotating direction of the propeller 13 and the propeller shaft 12 is switched between the forward direction (clockwise when the propeller 13 is viewed from the rear side) and the reverse direction (direction opposite to the forward direction). Accordingly, the direction of the thrust is switched.

As shown in FIG. 1, the outboard motor 4 includes an exhaust passage 41 that discharges exhaust generated in the engine 9 to the outside of the outboard motor 4. The exhaust passage 41 is provided inside the outboard motor 4. The exhaust passage 41 includes an exhaust port 42 open at the rear end portion of the propeller 13 (rear end portion of the outer cylinder 13a), and a main exhaust passage 44 extending from the combustion chambers 43 of the engine 9 to the exhaust port 42. The exhaust passage 41 includes an idle exhaust port 45 open at the outer surface of the outboard motor 4, and an idle exhaust passage 46 extending from the main exhaust passage 44 to the idle exhaust port 45.

As shown in FIG. 1, the main exhaust passage 44 extends downward from the engine 9 to the propeller shaft 12 via the exhaust guide 18, and extends rearward along the propeller shaft 12. The main exhaust passage 44 opens rearward at the rear end portion of the propeller 13. Therefore, the exhaust port 42 is disposed in water. The idle exhaust port 45 and the idle exhaust passage 46 are disposed at a higher position than the exhaust port 42. The idle exhaust passage 46 is branched from the main exhaust passage 44. The idle exhaust port 45 is disposed at a higher position than the waterline WL (the height of the surface of water when the vessel 1 equipped with the vessel propulsion apparatus 2 stops). Therefore, the idle exhaust port 45 is exposed to air.

As shown in FIG. 1, exhaust generated in the combustion chambers 43 is discharged to the main exhaust passage 44, and guided toward the exhaust port 42. When the output of the engine 9 is high, the exhaust inside the main exhaust passage 44 is discharged in water mainly from the exhaust port 42. A portion of the exhaust inside the main exhaust passage 44 is guided to the idle exhaust port 45 by the idle exhaust passage 46, and released to the atmosphere from the idle exhaust port 45. On the other hand, when the output of the engine 9 is low (for example, when the engine 9 idles), the exhaust pressure inside the main exhaust passage 44 is low, so that the exhaust inside the main exhaust passage 44 is released to the atmosphere mainly from the idle exhaust port 45.

As shown in FIG. 2, the engine 9 is a water-cooled engine. The outboard motor 4 includes a water cooling device 50 that cools the inside of the outboard motor 4. The water cooling device 50 includes a water inlet 22 open at the outer surface of the outboard motor 4, a cooling water passage 23 (water jacket) provided in the engine 9, and a water supply path 24 extending from the water inlet 22 to the cooling water passage 23. The water cooling device 50 further includes a water pump 25 that supplies water outside the outboard motor 4 as cooling water to the inside of the outboard motor 4 (cooling water passage 23) from the water inlet 22, and a pressure control valve (hereinafter, referred to as "PCV") 35 that regulates the pressure inside the cooling water passage 23. The water cooling device 50 further includes a water outlet 26 open at the outer surface of the outboard motor 4 (refer also to FIG. 1), a drainage path 27 extending from the cooling water passage 23 to the water outlet 26 inside the outboard motor 4, and a thermostat 36 that controls the flow of water from the cooling water passage 23 to the drainage path 27.

As shown in FIG. 1, the water inlet 22 is disposed at a lower position than the cooling water passage 23 and the water pump 25. The water inlet 22 opens at the outer surface of the lower case 20. Therefore, the water inlet 22 is disposed in the water. The water inlet 22 is connected to the cooling water passage 23 via the water supply path 24 provided inside the outboard motor 4. The water pump 25 is disposed in the water supply path 24. Therefore, the water pump 25 is disposed inside the outboard motor 4. The water pump 25 is disposed inside the outboard motor 4 at a height lower than the engine 9. As shown in FIG. 2, the PCV 35 is connected to the water supply path 24. The PCV 35 is preferably disposed at the same height as the exhaust guide 18.

As shown in FIG. 1, the water pump 25 is attached to the drive shaft 10. The water pump 25 is, for example, a rotary pump including an impeller (not illustrated) that rotates together with the drive shaft 10 and a pump case (not illustrated) that houses the impeller. When the engine 9 rotates the drive shaft 10, the impeller rotates inside the pump case, and suction power to suction water outside the outboard motor 4 to the water inlet 22 is generated. Therefore, the water pump 25 is driven by the engine 9.

As shown in FIG. 2, water outside the outboard motor 4 as cooling water is suctioned from the water inlet 22 into the water supply path 24, and supplied from the water supply path 24 into the cooling water passage 23 via the water pump 25. Accordingly, high-temperature portions such as the engine 9 are cooled by the cooling water. Then, the cooling water supplied to the engine 9 is guided by the drainage path 27 to the water outlet 26 (refer also to FIG. 1) open at the outer surface of the lower case 20 and discharged from the water outlet 26.

Figure 3:
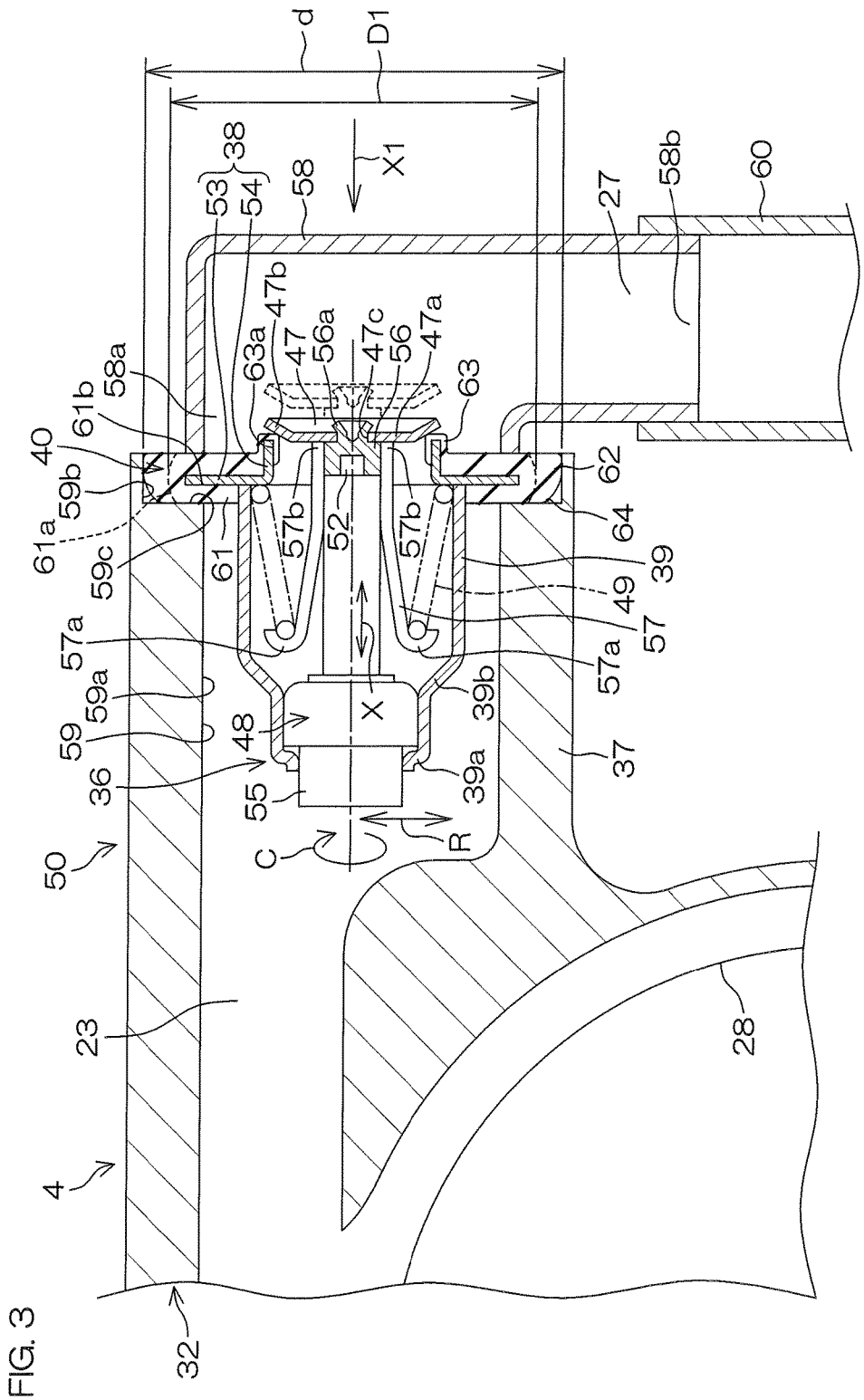
FIG. 3 is a drawing showing a thermostat in a state in which it is fitted to the housing.
Figure 4:
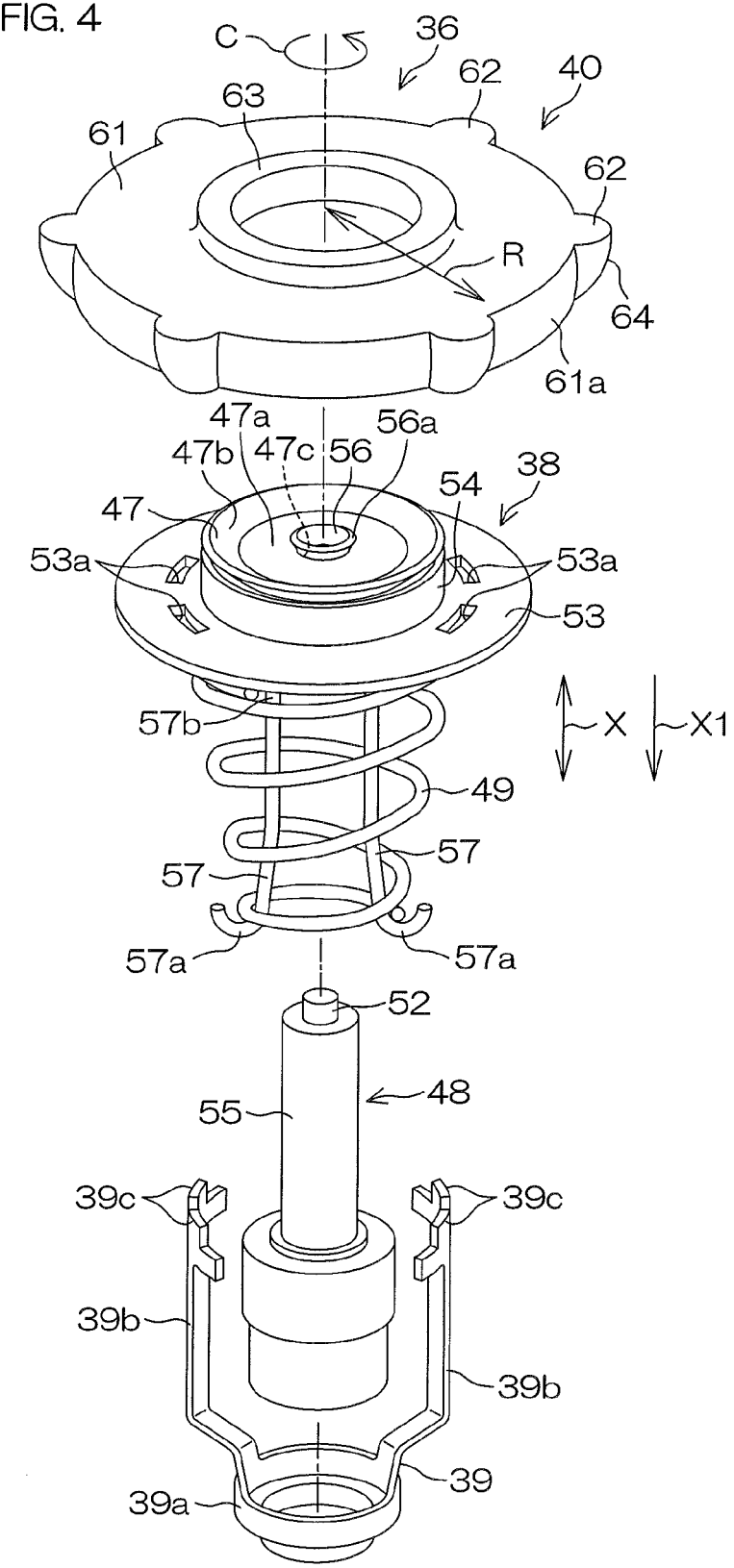
FIG. 4 is an exploded perspective view of the thermostat.

FIG. 3 is a drawing showing the thermostat 36 in a state in which it is fitted to the housing 37. FIG. 4 is an exploded perspective view of the thermostat 36. Here, the orientations of the members shown in FIG. 3 are the same as in FIG. 1. The up-down direction of FIG. 4 corresponds to the left-right direction of FIG. 3.

As shown in FIG. 3, the water cooling device 50 includes a housing 37 preferably made of aluminum, a thermostat cover 58 preferably made of resin or metal, and a hose 60. The thermostat 36 is disposed between the housing 37 and the thermostat cover 58. The thermostat 36 is inserted in the fitting direction X1 into the cylindrical housing 37, and accordingly, the thermostat 36 is fitted to the housing 37. Thereafter, the thermostat cover 58 is fixed to the cylinder body 32.

As shown in FIG. 3, the housing 37 is preferably integral and unitary with the cylinder body 32. The housing 37 preferably has a cylindrical or substantially cylindrical shape projecting from the cylinder body 32. FIG. 3 shows an example in which the housing 37 extends in the horizontal direction. The housing 37 may extend in the vertical direction, or may extend in a direction inclined with respect to the vertical direction and the horizontal direction. An inner surface 59 of the housing 37 defines a portion of the cooling water passage 23.

Hereinafter, "directions along the center line of the inner surface 59 of the housing 37" are referred to as "axial directions X," and "directions orthogonal or substantially orthogonal to the center line of the inner surface 59 of the housing 37" are referred to as "radial directions R." In addition, "a direction around the center line of the inner surface 59 of the housing 37" is referred to as "a circumferential direction C." The fitting direction X1 of the thermostat 36 to the housing 37 is one direction from the tip end portion of the housing 37 (an end portion provided with an opening, that is, in FIG. 3, the right end portion) toward the root portion of the housing 37 (in FIG. 3, the left end portion) of the axial directions X.

As shown in FIG. 3, the inner surface 59 of the housing 37 includes a cylindrical small-diameter portion 59a and a cylindrical large-diameter portion 59b that is disposed at the tip end portion (right end portion in FIG. 3) of the housing 37 and has a diameter larger than that of the small-diameter portion 59a. The small-diameter portion 59a and the large-diameter portion 59b surround the center line of the inner surface 59 of the housing 37 in the circumferential direction C. The inner surface 59 of the housing 37 further includes an annular portion 59c that connects the large-diameter portion 59b and the small-diameter portion 59a to each other. The annular portion 59c is orthogonal or substantially orthogonal to the center line of the inner surface 59 of the housing 37, and extends in the radial directions R.

As shown in FIG. 3, the thermostat cover 58 includes a presser portion 58a provided with an inlet for the cooling water, and a hose-attached portion 58b provided with an outlet for the cooling water. The thermostat cover 58 is preferably fixed to the cylinder body 32 with bolts, for example (not shown). First end portion of the hose 60 is attached to the hose-attached portion 58b. Second end portion of the hose 60 is attached to the cylinder body 32. The cooling water that flows out from the housing 37 flows to the inside of the thermostat cover 58 through the inlet, and is discharged into the hose 60 through the outlet. Thus, the hose 60 and the thermostat cover 58 define a portion of the drainage path 27.

As shown in FIG. 3, the thermostat 36 includes an annular flange 38 provided with an opening portion 54 through which the cooling water passes at the central portion, and a sealing member 40 that hermetically seals the gap between the flange 38 and the inner surface 59 of the housing 37. The thermostat 36 further includes a valve element 47 that is configured to open and close the opening portion 54 of the flange 38, a thermo element 48 that moves the valve element 47 to an open position (the position shown by the dashed lines) at which the opening portion 54 of the flange 38 is opened, and a spring 49 that moves the valve element 47 to a closed position (the position shown by the solid lines) at which the opening portion 54 of the flange 38 is closed. The thermostat 36 further includes a frame 39 that holds the thermo element 48 and a holder 57 that transmits a restoring force of the spring 49 to the valve element 47.

The frame 39 is preferably made of copper or stainless steel. Specifically, the frame 39 is made of a metal material having an ionization tendency lower than that of the housing 37 made of aluminum. As shown in FIG. 3, the frame 39 extends in the axial directions X from the flange 38. As shown in FIG. 4, the frame 39 includes a cylindrical holding portion 39a that holds the thermo element 48, and a plurality of arm portions 39b extending in the axial directions X from the holding portion 39a toward the flange 38. The arm portions 39b are fixed to the flange 38.

As shown in FIG. 3 and FIG. 4, the thermo element 48 includes a columnar element main body 55 held by the holding portion 39a of the frame 39, and a piston 52 projecting in the axial directions X from the end portion of the element main body 55. The piston 52 is movable in the axial directions X with respect to the element main body 55. The piston 52 is connected to the valve element 47 by a stud 56. The piston 52 moves in the axial directions X together with the valve element 47. When the temperature of the thermo element 48 rises, the wax stored in the element main body 55 expands, so that the projecting amount of the piston 52 from the element main body 55 increases. Accordingly, the piston 52 and the valve element 47 move away from the element main body 55 in the axial directions X, and the valve element 47 is moved to the open position.

As shown in FIG. 3 and FIG. 4, the holder 57 extends in the axial directions X from the valve element 47. The root portion 57b of the holder 57 is fixed to the valve element 47. Therefore, the holder 57 moves in the axial directions X together with the valve element 47. The tip end portion 57a of the holder 57 is in contact with the spring 49. The spring 49 is disposed between the tip end portion 57a of the holder 57 and a toric portion 53 of the flange 38. The tip end portion 57a of the holder 57 is pushed away from the toric portion 53 of the flange 38 in the axial directions X by the elastic restoring force of the spring 49. Accordingly, a force to move the valve element 47 toward the closed position is transmitted to the valve element 47 via the holder 57. When the temperature of the thermo element 48 is lower than a predetermined temperature, the force to move the valve element 47 toward the closed position (a force caused by the spring 49) exceeds a force to move the valve element 47 toward the open position (a force caused by the thermo element 48). Therefore, when the thermo element 48 is at a temperature lower than the predetermined temperature, the valve element 47 is disposed at the closed position.

As shown in FIG. 3 and FIG. 4, the flange 38 is preferably an integral and unitary plate. The flange 38 includes a plate-shaped toric portion 53 provided with through-holes at the central portion, and a cylindrical opening portion 54 extending in the axial directions X from the inner peripheral portion of the toric portion 53. A plurality of projecting portions 39c provided on the arm portions 39b of the frame 39 are inserted in a plurality of through-holes 53a provided in the toric portion 53. The plurality of projecting portions 39c of the frame 39 are fixed to a disk portion 47a by, for example, caulking. The toric portion 53 is coaxial with the opening portion 54. The tip end portion of the opening portion 54 that is an end portion on the opposite side of the toric portion 53 faces the valve element 47 in the axial directions X. The inner diameter of the tip end portion of the opening portion 54 is smaller than the outer diameter of the valve element 47.

As shown in FIG. 4, the valve element 47 is preferably an integral and unitary plate. The valve element 47 includes a disk portion 47a orthogonal or substantially orthogonal to the axial directions X, and a slope portion 47b extending obliquely outward in the radial directions R toward a direction opposite to the fitting direction X1 from the outer peripheral portion of the disk portion 47a. The end portion 56a of the stud 56 connecting the piston 52 and the valve element 47 is inserted into a through-hole 47c piercing the central portion of the disk portion 47a in the axial directions X. The end portion 56a of the stud 56 is fixed to the disk portion 47a by, for example, caulking. The root portion 57b of the holder 57 is fixed to the disk portion 47a. The valve element 47 is held by the flange 38 via the holder 57 and the spring 49. The valve element 47 is movable in the axial directions X between the open position and the closed position with respect to the flange 38.

Figure 5:
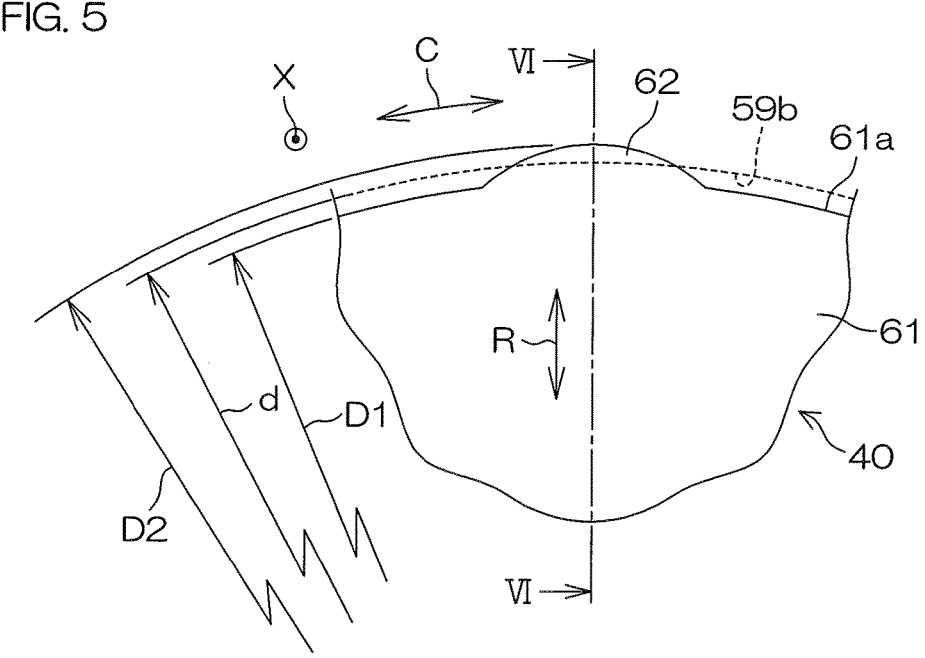
FIG. 5 is an enlarged view of the periphery of a protruding portion of a sealing member when the sealing member is viewed from the direction in which the thermostat is fitted to the housing.
Figure 6:
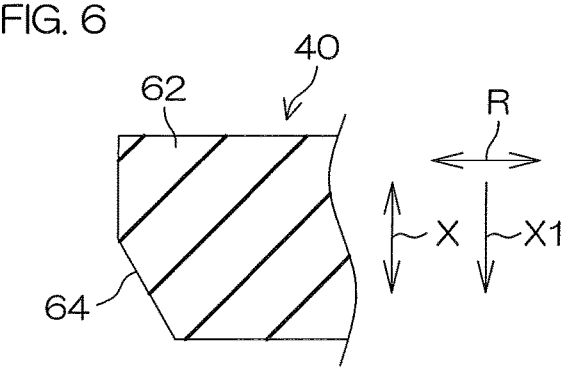
FIG. 6 is a sectional view taken along line VI-VI in FIG. 5.

FIG. 5 is an enlarged view of the periphery of the protruding portion 62 of the sealing member 40 when the sealing member 40 is viewed from the fitting direction X1 of the thermostat 36 to the housing 37. FIG. 6 is a sectional view taken along line VI-VI in FIG. 5. FIG. 5 and FIG. 6 show a free state of the sealing member 40 (a state in which the sealing member is not elastically deformed).

The sealing member 40 is preferably made of an elastic material such as resin or rubber. As shown in FIG. 4, the sealing member 40 includes an integral and unitary annular outer peripheral portion 61 extending in the radial directions R, a plurality of protruding portions 62 extending outward in the radial directions R from the outer surface 61a of the outer peripheral portion 61, and a cylindrical valve seat 63 extending in the axial directions X from the inner peripheral surface of the outer peripheral portion 61. As shown by the dashed lines in FIG. 3, the outer surface 61a of the outer peripheral portion 61 has an arc sectional shape protruding outward in the radial directions R.

The plurality of protruding portions 62 of the sealing member 40 are preferably three or more in number, for example. FIG. 4 shows an example in which the sealing member 40 is provided with six protruding portions 62. The plurality of protruding portions 62 are disposed at equal or substantially equal intervals in the circumferential direction C.

As shown in FIG. 5, when the sealing member 40 is viewed in the fitting direction X1, the outer surface of the protruding portion 62 has an arc shape protruding outward in the radial directions R. As shown in FIG. 6, the outer surface of the protruding portion 62 includes an inclined portion 64 inclined with respect to the axial directions X and the radial directions R. The inclined portion 64 of the protruding portion 62 extends obliquely inward in the radial directions R toward the frame 39 (refer also to FIG. 3). FIG.

6 shows an example in which the inclined portion 64 is straight, and the inclination angle of the inclined portion 64 with respect to the axial directions X is fixed. However, the inclination angle of the inclined portion 64 with respect to the axial directions X may not be fixed. Specifically, the inclined portion 64 may have an arc sectional shape protruding outward in the radial directions R.

As shown in FIG. 3, the sealing member 40 includes an internal space 61b provided inside the outer peripheral portion 61 and an internal space 63a provided inside the valve seat 63. The internal space 61b provided inside the outer peripheral portion 61 has an annular shape extending in the radial directions R, and the internal space 63a provided inside the valve seat 63 has a cylindrical shape extending in the axial directions X. The toric portion 53 of the flange 38 is disposed in the internal space 61b provided inside the outer peripheral portion 61, and the opening portion 54 of the flange 38 is disposed in the internal space 63a provided inside the valve seat 63.

As shown in FIG. 3, the outer diameter D1 of the outer peripheral portion 61 of the sealing member 40 is smaller than the inner diameter d of the large-diameter portion 59b of the inner surface 59 of the housing 37. The outer diameter D1 of the outer peripheral portion 61 of the sealing member 40 is larger than the inner diameter of the small-diameter portion 59a of the inner surface 59 of the housing 37. The outer diameter D1 of the outer peripheral portion 61 of the sealing member 40 is larger than the outer diameter of the presser portion 58a of the thermostat cover 58. Therefore, the outer peripheral portion 61 of the sealing member 40 is sandwiched (elastically compressed) in the axial directions X by the inner surface 59 of the housing 37 and the presser portion 58a of the thermostat cover 58 inside the large-diameter portion 59b of the housing 37. The outer surface 61a of the outer peripheral portion 61 of the sealing member 40 is spaced apart inward in the radial directions R from the large-diameter portion 59b, and is not in contact with the large-diameter portion 59b. The outer peripheral portion 61 of the sealing member 40 hermetically seals the gap between the flange 38 and the inner surface 59 of the housing 37. The gap between the inlet of the thermostat cover 58 and the end surface in the axial directions of the outer peripheral portion 61 of the sealing member 40 is hermetically sealed. Specifically, the gap between the flange 38 and the thermostat cover 58 is hermetically sealed by the sealing member 40.

On the other hand, as shown in FIG. 5, in a free state of the thermostat 36 before it is fitted to the housing 37, the outer ends in the radial directions R of the protruding portions 62 of the sealing member 40 are disposed on the circumference with a diameter D2 larger than the inner diameter d of the large-diameter portion 59b of the inner surface 59 of the housing 37. Therefore, when the thermostat 36 is attached to the housing 37, the protruding portions 62 are inserted into the large-diameter portion 59b while being elastically deformed. In the state in which the thermostat 36 is fitted to the outboard motor 4, the protruding portions 62 of the sealing member 40 extend outward in the radial directions R from the outer peripheral portion 61 toward the large-diameter portion 59b of the inner surface 59 of the housing 37. The outer ends in the radial directions R of the protruding portions 62 are, in this state, disposed on the same circumference as that of the large-diameter portion 59b of the inner surface 59 of the housing 37 (refer to FIG. 3).

Immediately after the engine 9 starts, the temperature of the engine 9 is comparatively low. Therefore, the temperature of the thermo element 48 is comparatively low. In the state in which the temperature of the thermo element 48 is low, the force to move the valve element 47 toward the open position (a force caused by the thermo element 48) is smaller than the force to move the valve element 47 toward the closed position (a force caused by the spring 49). Therefore, the valve element 47 is pressed against the valve seat 63. Specifically, the valve element 47 is positioned at the closed position, and the gap between the valve seat 63 and the slope portion 47b of the valve element 47 is hermetically closed. Therefore, the cooling water passage 23 is closed by the thermostat 36. Accordingly, as shown in FIG. 2, the cooling water taken from the water inlet 22 into the water supply path 24 and the cooling water passage 23 by the water pump 25 is stopped by the thermostat 36.

As described above, the impeller of the water pump 25 rotates together with the engine 9 to generate a suctioning force to take the cooling water into the water inlet 22. Therefore, during operation of the engine 9, the cooling water is continuously supplied into the water supply path 29 and the cooling water passage 23. Therefore, the pressures (water pressures) inside the water supply path 24 and the cooling water passage 23 rise. When the pressures exceed a predetermined value, the PCV 35 is actuated. The cooling water taken from the water inlet 22 into the water supply path 24 directly flows into the drainage path 27 from the PCV 35 without passing through the cooling water passage 23 due to actuation of the PCV 35. The cooling water that flows into the drainage path 27 is discharged from the water outlet 26. While the PCV 35 is open, the cooling water stays inside the engine 9 so that warming-up of the engine 9 is promoted.

When warming-up of the engine 9 advances and the temperatures of the engine 9 and the cooling water rise, the temperature of the thermo element 48 also rises. Therefore, the force to move the valve element 47 toward the open position (a force caused by the thermo element 48) increases, and the force to move the valve element 47 toward the open position exceeds the force to move the valve element 47 toward the closed position (a force caused by the spring 49). Therefore, as shown by the dashed lines in FIG. 3, the valve element 47 moves to the open position, and hermetical closing between the valve seat 63 and the valve element 47 is released. Accordingly, the thermostat 36 opens.

As shown in FIG. 2, when the thermostat 36 opens, the cooling water inside the cooling water passage 23 passes through the thermostat 36 and flows into the drainage path 27. Then, the cooling water inside the water supply path 24 flows into the cooling water passage 23. Thus, when the pressures inside the water supply path 24 and the cooling water passage 23 are reduced by the start of flowing of the cooling water inside the cooling water passage 23, the PCV 35 closes. Therefore, the cooling water does not directly flow into the drainage path 27 from the water supply path 24.

As described above, according to a preferred embodiment of the present invention, the annular outer peripheral portion 61 and the plurality of protruding portions 62 are provided on the sealing member 40 of the thermostat 36. The plurality of protruding portions 62 extend outward in the radial directions R from the outer peripheral portion 61 toward the large-diameter portion 59b of the inner surface 59 of the housing 37. Therefore, the gap in the radial directions R between the sealing member 40 and the large-diameter portion 59b of the inner surface 59 decreases, as compared to the case in which the protruding portions 62 are not provided. Therefore, the stability of the position of the thermostat 36 when the thermostat 36 is fitted to the housing 37 is improved. Therefore, the size of the gap between the frame 39 and the inner surface 59 of the housing 37 is stabilized. Accordingly, a large gap is provided between the frame 39 and the inner surface 59 of the housing 37, so that the state in which the frame 39 and the inner surface 59 of the housing 37 are spaced apart from each other is maintained.

The sealing member 40 is preferably made of an elastic material. The outer peripheral portion 61 of the sealing member 40 is sandwiched in the axial directions X by the inner surface 59 and the thermostat cover 58 inside the large-diameter portion 59b of the inner surface 59 of the housing 37. In other words, the sealing member 40 is elastically deformed by being sandwiched by the inner surface 58 and the thermostat cover 58 to hermetically seal the gap between the flange 38 and the inner surface 59 of the housing 37. The whole outer peripheral portion 61 is not enlarged outward in the radial directions R, but the plurality of protruding portions 62 extend outward in the radial directions R from the outer peripheral portion 61 and are aligned at intervals in the circumferential direction C, so that the volume of the portion to be sandwiched by the inner surface 59 of the housing 37 and the thermostat cover 58 is reduced. Accordingly, the elastic deformation amount of the sealing member 40 is reduced to be within a proper range. Therefore, excellent sealing performance is maintained for a long period of time.

In a preferred embodiment of the present invention, in the free state before the thermostat 36 is fitted to the housing 37, the outer ends of the protruding portions 62 of the sealing member 40 are disposed on the circumference with a diameter larger than that of the large-diameter portion 59b of the inner surface 59 of the housing 37. The outer diameter D1 of the outer peripheral portion 61 of the sealing member 40 is smaller than the inner diameter d of the large-diameter portion 59b. Therefore, when the thermostat 36 is fitted to the housing 37, the protruding portions 62 of the sealing member 40 are compressed in the radial directions R between the large-diameter portion 59b of the housing 37 and the outer peripheral portion 61 of the sealing member 40. Specifically, the sealing member 40 is fitted to the housing 37 while being press-fitted into the large-diameter portion 59b of the housing 37. Due to this press fitting, the stability of the position of the thermostat 36 when the thermostat 36 is fitted to the housing 37 is further improved. Therefore, when the thermostat 36 is fitted, the thermostat 36 is prevented from detaching from the housing 37.

In a preferred embodiment of the present invention, the protruding portions 62 of the sealing member 40 are disposed at equal or substantially equal intervals in the circumferential direction C on the outer peripheral portion 61, so that the gaps in the radial directions R between the protruding portions 62 of the sealing member 40 and the large-diameter portion 59b of the housing 37 are reduced at the plurality of positions at equal or substantially equal intervals in the circumferential direction C. Therefore, when the thermostat 36 is fitted to the housing 37, the sealing member 40 is easily and uniformly elastically deformed. Therefore, tilting of the thermostat 36 in the radial directions R when the thermostat 36 is fitted to the housing 37 is reduced or prevented. Accordingly, the size of the gap between the frame 39 and the inner surface 59 is further stabilized.

In a preferred embodiment of the present invention, the outer surfaces of the protruding portions 62 of the sealing member 40 include inclined portions 64 extending obliquely inward in the radial directions R toward the frame 39. Therefore, the thermostat 36 is fitted to the housing 37 while being guided by the inclined portions 64. Accordingly, the thermostat 36 is easily fitted to the housing 37.

In a preferred embodiment of the present invention, at least three or more protruding portions 62 of the sealing member 40 are provided. Therefore, the sealing member 40 preferably includes three or more portions at which the gap in the radial directions R between the sealing member 40 and the large-diameter portion 59b of the housing 37 is small. Therefore, when the thermostat 36 is fitted to the housing 37, the position of the thermostat 36 hardly deviates with respect to the housing 37. Accordingly, the stability of the position of the thermostat 36 when the thermostat 36 is fitted to the housing 37 is further improved.

In a preferred embodiment of the present invention, the housing 37 is preferably made of aluminum, and the frame 39 is preferably made of copper or stainless steel. The housing 37 is preferably made of a metal material having an ionization tendency higher than that of the frame 39, so that the housing more easily corrodes than the frame 39. As described above, the plurality of protruding portions 62 are provided on the sealing member 40, so that the stability of the position of the thermostat 36 when the thermostat 36 is fitted to the housing 37 is improved. Therefore, even if the gap in the radial directions R between the frame 39 and the inner surface 59 of the housing 37 is increased, the state in which the frame 39 and the inner surface 59 are spaced apart from each other is maintained. Accordingly, water leakage that occurs due to contact between the frame 39 and the housing 37 is reliably prevented.

In a preferred embodiment of the present invention, the engine 9 preferably includes a cylinder body 32 integral and unitary with the housing 37 of the water cooling device 50. Accordingly, the number of components of the engine 9 is reduced, as compared to the case in which the housing 37 and the cylinder body 32 are separate members.

In a preferred embodiment of the present invention, the water pump 25 preferably supplies water outside the outboard motor 4 into the cooling water passage 23. When the outboard motor 4 is used at sea, seawater flows inside the cooling water passage 23 so that corrosion of the housing 37 easily progresses. Even in this case, the thermostat 36 is kept in a state in which the frame 39 and the inner surface 59 are spaced apart from each other so that the cooling water passage 23 is prevented from corroding.

Although preferred embodiments of the present invention have been described above, the present invention is not restricted to the contents of the preferred embodiments and various modifications are possible within the scope of the present invention.

For example, in the above-described preferred embodiments, a case in which the protruding portions 62 of the sealing member 40 preferably have arc shapes protruding outward in the radial directions R as viewed in the fitting direction X1 was described. However, the protruding portions 62 may have polygonal shapes, etc., protruding outward in the radial directions R as viewed in the fitting direction X1.

In the above-described preferred embodiments, a case in which the outer ends of the protruding portions 62 of the sealing member 40 are preferably disposed on the circumference with the diameter D2 larger than the inner diameter d of the large-diameter portion 59b, so that the protruding portions 62 are inserted into the large-diameter portion 59b of the inner surface 59 of the housing 37 while being elastically deformed, was described. However, the outer ends of the protruding portions 62 may be disposed on a circumference with a diameter smaller than the inner diameter d in a free state before the thermostat 36 is fitted to the housing 37.

In the above-described preferred embodiments, a case in which the plurality of protruding portions 62 of the sealing member 40 are preferably disposed at equal or substantially equal intervals in the circumferential direction C was described. However, when three or more protruding portions 62 are provided on the sealing member 40, the plurality of protruding portions 62 may be disposed at unequal intervals in the circumferential direction C.

In the above-described preferred embodiments, a case in which the outer surfaces of the protruding portions 62 preferably include inclined portions 64 extending obliquely inward in the radial directions R toward the frame 39 was described. However, the protruding portions 62 may not include the inclined portions 64. Specifically, the outer surfaces of the protruding portions 62 may extend straight in the axial directions X from first ends of the protruding portions 62 to second ends of the protruding portions 62.

In the above-described preferred embodiments, a case in which at least three protruding portions 62 are preferably provided on the sealing member 40 was described. However, the number of the protruding portions 62 may be one or two, for example.

In the above-described preferred embodiments, it was described that the housing 37 is preferably made of aluminum and the frame 39 is preferably made of copper or stainless steel. However, the housing 37 may be made of a metal material other than aluminum, and the frame 39 may be made of a metal material other than copper or stainless steel. In this case, the frame 39 is not necessarily made of a metal material having an ionization tendency lower than that of the housing 37. Specifically, the frame 39 may be made of a metal material having the same ionization tendency as that of the housing 37, or may be made of a metal material having an ionization tendency higher than that of the housing 37.

In the above-described preferred embodiments, a case in which the water cooling device 50 was provided in the engine 9 for the outboard motor 4 was described. However, the water cooling device 50 may be provided in an engine for an inboard/outboard motor or an inboard motor, or may be provided in an engine for a personal watercraft.

Also, various features of two or more of all of the preferred embodiments described above may be combined.

The present application claims priority to Japanese Patent Application No. 2013-227330 filed on Oct. 31, 2013 in the Japan Patent Office, and the entire disclosure of this application is incorporated herein by reference.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A thermostat disposed in a housing defining a portion of a cooling water passage, and configured to open and close the cooling water passage according to a temperature of cooling water inside the cooling water passage, the thermostat comprising:
    an annular flange extending in radial directions and surrounded by a cylindrical large-diameter portion of an inner surface of the housing;
    a frame extending in axial directions from the annular flange; and
    a sealing member made of an elastic material and arranged to seal a gap between the annular flange and the inner surface of the housing; wherein
    the sealing member includes:
        an annular outer peripheral portion sandwiched in the axial directions by the inner surface of the housing and a thermostat cover inside the large-diameter portion of the inner surface of the housing; and
        a plurality of protruding portions extending outward in the radial directions from the outer peripheral portion toward the large-diameter portion of the inner surface of the housing;
    outer ends of the plurality of protruding portions are disposed on a circumference coaxial with the outer peripheral portion and having a diameter larger than an inner diameter of the large-diameter portion in a free state in which the sealing member is not elastically deformed;
    an outer diameter of the outer peripheral portion is smaller than the inner diameter of the large-diameter portion in a sandwiched state in which the outer peripheral portion of the sealing member is sandwiched in the axial directions by the inner surface of the housing and the thermostat cover; and
    the outer diameter of the outer peripheral portion is larger than an outer diameter of a presser portion of the thermostat cover in the sandwiched state, and in the sandwiched state the outer peripheral portion of the sealing member is sandwiched in the axial directions by the inner surface of the housing and the presser portion of the thermostat cover.

2. The thermostat according to claim 1, wherein the plurality of protruding portions are disposed at equal or substantially equal intervals along a circumferential direction.

3. The thermostat according to claim 1, wherein outer surfaces of the plurality of protruding portions include inclined portions extending obliquely inward in the radial directions toward the frame.

4. The thermostat according to claim 1, wherein the plurality of protruding portions include at least three protruding portions.

5. A water cooling device comprising:
    a metallic housing including a cylindrical housing inner surface defining a portion of a cooling water passage; and
    the thermostat according to claim 1 including the frame made of a metal material having an ionization tendency lower than that of the housing.

6. The water cooling device according to claim 5, further comprising a thermostat cover sandwiching the outer peripheral portion of the sealing member of the thermostat in the axial directions in conjunction with the inner surface of the housing inside the large-diameter portion of the housing inner surface.

7. The water cooling device according to claim 5, wherein the housing is made of aluminum, and the frame is made of copper or stainless steel.

8. A water-cooled engine comprising:
    the water cooling device according to claim 5; and
    a cylinder body integral and unitary with the housing of the water cooling device.

9. A vessel propulsion apparatus comprising:
    a housing including a cylindrical housing inner surface defining a portion of a cooling water passage; and a thermostat disposed inside the housing and configured to open and close the cooling water passage according to a temperature of cooling water inside the cooling water passage; wherein the thermostat includes:
- an annular flange extending in radial directions and surrounded by a cylindrical large-diameter portion of the housing inner surface;
- a frame extending in axial directions from the annular flange; and
- a sealing member made of an elastic material and arranged to hermetically seal a gap between the annular flange and the housing inner surface; and the sealing member includes:
- an annular outer peripheral portion sandwiched in the axial directions by the housing inner surface and a thermostat cover inside the large-diameter portion of the housing inner surface; and
- a plurality of protruding portions extending outward in the radial directions from the outer peripheral portion toward the large-diameter portion of the housing inner surface;

outer ends of the plurality of protruding portions are disposed on a circumference coaxial with the outer peripheral portion and having a diameter larger than an inner diameter of the large-diameter portion in a free state in which the sealing member is not elastically deformed;

an outer diameter of the outer peripheral portion is smaller than the inner diameter of the large-diameter portion in a sandwiched state in which the outer peripheral portion of the sealing member is sandwiched in the axial directions by the inner surface of the housing and the thermostat cover; and the outer diameter of the outer peripheral portion is larger than an outer diameter of a presser portion of the thermostat cover in the sandwiched state, and in the sandwiched state the outer peripheral portion of the sealing member is sandwiched in the axial directions by the inner surface of the housing and the presser portion of the thermostat cover.

10. The vessel propulsion apparatus according to claim 9, wherein the plurality of protruding portions are disposed at equal or substantially equal intervals along a circumferential direction.

11. The vessel propulsion apparatus according to claim 9, wherein outer surfaces of the plurality of protruding portions include inclined portions extending obliquely inward in the radial directions toward the frame.

12. The vessel propulsion apparatus according to claim 9, wherein the plurality of protruding portions include at least three protruding portions.

13. The vessel propulsion apparatus according to claim 9, wherein the housing is made of metal, and the frame is made of a metal material having an ionization tendency lower than that of the housing.

14. The vessel propulsion apparatus according to claim 9, further comprising a thermostat cover sandwiching the outer peripheral portion of the sealing member of the thermostat in the axial directions in conjunction with the housing inner surface inside the large-diameter portion of the housing inner surface.

15. The vessel propulsion apparatus according to claim 13, wherein the housing is made of aluminum, and the frame is made of copper or stainless steel.

16. The vessel propulsion apparatus according to claim 9, further comprising an engine including a cylinder body integral and unitary with the housing.

17. The vessel propulsion apparatus according to claim 9, further comprising a water pump configured to supply water outside the vessel propulsion apparatus into the cooling water passage.

18. The thermostat according to claim 1, wherein an outer surface of the outer peripheral portion is spaced apart from the large-diameter portion in the radial directions.

19. The vessel propulsion apparatus according to claim 9, wherein an outer surface of the outer peripheral portion is spaced apart from the large-diameter portion in the radial directions.

\* \* \* \* \*